(12) United States Patent
Kibi et al.

(10) Patent No.: US 6,702,963 B2
(45) Date of Patent: Mar. 9, 2004

(54) METHOD OF PRODUCING A POLARIZABLE ELECTRODE

(75) Inventors: Yukari Kibi, Tokyo (JP); Takashi Saito, Tokyo (JP); Shinobu Takagi, Aichi (JP); Takayoshi Shimizu, Aichi (JP)

(73) Assignee: NEC Corporation, Tokyo (JP)

( * ) Notice: Subject to any disclaimer, the term of this patent is extended or adjusted under 35 U.S.C. 154(b) by 297 days.

(21) Appl. No.: 09/927,533

(22) Filed: Aug. 13, 2001

(65) Prior Publication Data

US 2002/0027305 A1 Mar. 7, 2002

Related U.S. Application Data

(62) Division of application No. 09/174,311, filed on Oct. 19, 1998, now abandoned.

(30) Foreign Application Priority Data

Oct. 17, 1997 (JP) .............................................. 9/284787

(51) Int. Cl.$^7$ ........................ C01B 31/02; H01G 9/058; H01M 4/58
(52) U.S. Cl. .................................... 264/29.6; 423/447.7
(58) Field of Search ....................... 264/29.6; 423/447.7

(56) References Cited

U.S. PATENT DOCUMENTS

| | | | |
|---|---|---|---|
| 5,654,059 A | 8/1997 | Hecht | |
| 5,796,574 A | 8/1998 | Saito et al. | |
| 5,838,531 A | * 11/1998 | Saito et al. | ................. 361/502 |

FOREIGN PATENT DOCUMENTS

| | | | |
|---|---|---|---|
| JP | 63226019 A | | 9/1988 |
| JP | 04288361 A | | 10/1992 |
| JP | 0799141 A | | 4/1995 |
| JP | 07201677 A | | 8/1995 |
| JP | 9-36004 | | 2/1997 |
| JP | 09293648 A | * | 11/1997 |

* cited by examiner

*Primary Examiner*—Leo B. Tentoni
(74) *Attorney, Agent, or Firm*—Young & Thompson

(57) ABSTRACT

A polarizable electrode (1) includes an activated carbon/carbon composite consisting essentially of an activated carbon component and a carbon component. The activated carbon component includes activated carbon powder or fiber. The carbon component is produced by carbonizing a thermosetting resin. The composite has a density within a range between 0.70 and 0.85 g/cm$^3$, both inclusive, and a thickness within another range between 0.7 and 3.0 cm, both inclusive.

4 Claims, 4 Drawing Sheets

METHOD OF PRODUCING A POLARIZABLE ELECTRODE

This application is a division of application Ser. No. 09/174,311, filed on Oct. 19, 1998, now abandoned, the entire contents of which are hereby incorporated by reference.

BACKGROUND OF THE INVENTION

This invention relates to a polarizable electrode for use in an electric double-layer capacitor and, in particular, to a polarizable electrode for use in an electric double-layer capacitor suitable as a capacitor element of an open-air solar generator system. This invention also relates to a method of producing the polarizable electrode mentioned above.

An electric double-layer capacitor has a low resistance and a large capacitance. Because no chemical reaction is involved unlike a battery, deterioration due to repetition of charging and discharging operations is extremely small. Therefore, the electric double-layer capacitor can be used as a maintenance-free capacitor element. In addition, the electric double-layer capacitor is harmless to the environment since any harmful substance such as a heavy metal is not contained in its materials. In view of the above-mentioned advantages, the electric double-layer capacitor is widely used as a memory backup component. Specifically, the electric double-layer capacitor is connected in parallel to a power supply which comprises a battery or a DC power supply implemented by a commercial AC power supply and an AC/DC converter.

Upon occurrence of instantaneous interruption of the power supply, electric charges stored in the electric double-layer capacitor are used to back up various components. Typically, the electric double-layer capacitor used as the memory backup component has a capacitance of 2 to 3 F at most. In recent years, however, development is made of an improved electric double-layer capacitor having a remarkably large capacitance.

Japanese Patent No. 2054380 (corresponding to Japanese Unexamined Patent Publication (JP-A) No. 04-288361 (288361/1992)) discloses a polarizable electrode comprising an activated carbon/carbon composite. The activated carbon/carbon composite is formed by preparing a mixture of activated carbon powder and phenolic resin powder, molding the mixture into a molded product, and subjecting the molded product to heat treatment in an inactive gas atmosphere at a temperature on the order of 900° C. to carbonize the phenolic resin. It is reported in the above-mentioned patent that an electric double-layer capacitor having a capacitance of 470 F can be obtained by the use of the polarizable electrode.

Japanese Patent No. 2052267 (corresponding to Japanese Unexamined Patent Publication (JP-A) No. 63-226019 (226019/1988)) discloses a similar polarizable electrode comprising an activated carbon/carbon composite obtained by heating a mixture of activated carbon powder or fiber and a phenolic resin in an inactive gas atmosphere.

Each of the above-mentioned electric double-layer capacitors recently developed has an extremely large capacitance and is therefore expected not only as a memory backup component but also as a substitute battery or an auxiliary battery to back up an overall apparatus or to drive a motor. In particular, in response to a recent demand as a power supply of an electric automobile or a hybrid automobile, development in progress is intended for power applications which require excellent high-current characteristics. For the power applications, it is necessary to reduce a resistance of an electrolytic solution in the activated carbon/carbon composite electrode because such resistance prevents a discharging operation at a high electric current.

Japanese Unexamined Patent Publications (JP-A) Nos. 07-99141 (99141/1995) and 07-201677 (201677/1995) disclose activated carbon/carbon composite electrodes with small pores formed inside so as to improve high-current characteristics. Each of the activated carbon/carbon composite electrodes adapted for the power applications is excellent in high-current characteristics but has a capacitance per unit volume as small as 30–40 F/cm$^3$.

In the meanwhile, fossil resource energy supporting the current human life is not only limited in quantity but also has an adverse influence upon the environment which becomes more and more serious year after year. Under the circumstances, attention is directed to solar energy which is clean and infinite. A solar generator system utilizing the solar energy typically comprises a solar cell for converting the solar energy into electric energy and a capacitor element such as a lead-acid battery for storing the electric energy.

Such a solar generator system is advantageously used in an illumination light or a sign light which is lightened at night. Specifically, the electric energy generated from the solar energy during the daytime is stored in the capacitor element and spent at night to lighten the illumination light or the sign light.

In case where the capacitor element is used in combination with the solar cell to lighten the illumination light or the sign light at night, the capacitor element must perform each of charging and discharging operations once a day. If the lead-acid battery is used as the capacitor element, the lead-acid battery must be exchanged in one or two years because of heavy deterioration resulting from repetition of the charging and the discharging operations, In addition, the lead-acid battery itself is one of the factors: which cause environmental pollution. Taking the above into consideration, it is proposed to use the electric double-layer capacitor in place of the lead-acid battery. The electric double-layer capacitor can store smaller energy as compared with the lead-acid battery but does not require maintenance because of little deterioration resulting from the repetition of the charging and the discharging operations.

However, several problems arise if the electric double-layer capacitor is used in combination with the solar cell to lighten the illumination light or the sign light at night. At first, it is required to store in a single charging operation the electric energy sufficient to lighten the illumination light or the sign light all night. Specifically, an energy density of at least ¹⁄₁₀ of that of the lead-acid battery is generally required although it depends upon an overall scale of an illumination facility and an installation space. On the other hand, the above-mentioned electric double-layer capacitor developed for the power applications achieves an energy density on the order of ¹⁄₂₀ of that of the lead-acid battery. Thus, in order to use the electric double-layer capacitor in combination with the solar cell in the above-mentioned manner, the energy density must be increased to a level twice that for the power applications.

Second, the illumination light or the sign light are installed in the open air and is therefore exposed to a severe temperature environment. For example, the temperature falls down to −20° C. or less in a cold region. In order to allow the use in such an environment, the electric double-layer capacitor is required to be excellent in low-temperature characteristic.

In addition, there is a demand for an improved method of producing a polarizable electrode, which is simple in process and excellent in productivity.

SUMMARY OF THE INVENTION

It is an object of this invention to provide a polarizable electrode adapted for use in an electric double-layer capacitor large in capacitance and excellent in low-temperature characteristic.

It is another object of this invention to provide a method of producing a polarizable electrode of the type described, which is simple in process and excellent in productivity.

Other objects of this invention will become clear as the description proceed.

According to a first aspect of this invention, there is provided a polarizable electrode comprising an activated carbon/carbon composite consisting essentially of an activated carbon component and a carbon component, the activated carbon component comprising activated carbon powder, the carbon component being produced by carbonizing a thermosetting resin, the composite having a density within a range between 0.70 and 0.85 g/cm$^3$, both inclusive, and a thickness within another range between 0.7 and 3.0 cm, both inclusive.

According to a second aspect of this invention, the above-mentioned thermosetting resin is at least one selected from a group consisting of a phenolic resin, a furan resin, a urea resin, a melamine resin, a guanamine resin, an unsaturated polyester resin, a diallyl phthalate resin, an allyl diglycol carbonate resin, an epoxy resin, a vinyl ester resin, a phenoxy resin, and a polyurethane resin.

According to a third aspect of this invention, a weight ratio R of the activated carbon powder to the total weight of the activated carbon powder and the thermosetting resin is represented by:

$$R=aD+b$$

(0.80 cm$^3$/g $\leq a \leq$ 1.00 cm$^3$/g, 0.24 $\leq b \leq$ 0.29)

where D' represents a packing density of the activated carbon powder in g/cm$^3$.

According to a fourth aspect of this invention, there is provided a method for producing a polarizable electrode comprising an activated carbon/carbon composite consisting essentially of an activated carbon component and a carbon component, the activated carbon component comprising activated carbon powder, the carbon component being produced by carbonizing a thermosetting resin, the composite having a density within a range between 0.70 and 0.85 g/cm$^3$, both inclusive, and a thickness within another range between 0.7 and 3.0 cm, both inclusive, the method comprising the steps of (a) mixing the activated carbon powder and the thermosetting resin to produce a powdery mixture, (b) molding the powdery mixture into a molded product having a predetermined shape, and (c) subjecting be the molded product to heat treatment in a nonoxidizing atmosphere to carbonize the thermosetting resin so that an activated carbon/carbon composite electrode is obtained as the polarizable electrode, wherein:

the molding step is carried out by press-forming under a pressure between 0.1 and 8.0 tonf/cm$^2$, both inclusive.

According to a fifth aspect of this invention, there is provided a method for producing a polarizable electrode comprising an activated carbon/carbon composite consisting essentially of an activated carbon component and a carbon component, the activated carbon component comprising activated carbon powder, the carbon component being produced by carbonizing a thermosetting resin, the composite having a density within a range between 0.70 and 0.85 g/cm$^3$, both inclusive, and a thickness within another range between 0.7 and 3.0 cm, both inclusive, the method comprising the steps of (a) mixing the activated carbon powder and the thermosetting resin to produce a powdery mixture, (b) molding the powdery mixture into a molded product having a predetermined shape, and (c) subjecting the molded product to heat treatment in a nonoxidizing atmosphere to carbonize the thermosetting resin so that an activated carbon/carbon composite electrode is obtained as the polarizable electrode, wherein:

the mixing step is for mixing the activated carbon powder, the thermosetting resin, and a thermoplastic resin binder in a ratio between 30 and 60 wt %, both inclusive, with respect to the total weight of the activated carbon powder and the thermosetting resin to obtain the powdery mixture;

the molding step being carried out by extrusion-molding.

According to a sixth aspect of this invention, there is provided a polarizable electrode comprising an activated carbon/carbon composite consisting essentially of an activated carbon component and a carbon component, the activated carbon component comprising activated carbon fiber, the carbon component being produced by carbonizing a thermosetting resin, the composite having a density within a range between 0.70 and 0.85 g/cm$^3$, both inclusive, and a thickness within another range between 0.7 and 3.0 cm, both inclusive.

According to a seventh aspect of this invention, the above-mentioned thermosetting resin is at least one selected from a group consisting of a phenolic resin, a furan resin, a urea resin, a melamine resin, a guanamine resin, an unsaturated polyester resin, a diallyl phthalate resin, an allyl diglycol carbonate resin, an epoxy resin, a vinyl ester resin, a phenoxy resin, and a polyurethane resin.

According to an eighth aspect of this invention, a weight ratio R of the activated carbon fiber to the total weight of the activated carbon fiber and the thermosetting resin is represented by:

$$R=aD+b$$

(0.80 $\leq a \leq$ 1.00, 0.24 $\leq b \leq$ 0.39)

where D represents a packing density of the activated carbon fiber.

According to a ninth aspect of this invention, there is provided a method for producing a polarizable electrode comprising an activated carbon/carbon composite consisting essentially of an activated carbon component and a carbon component, the activated carbon component comprising activated carbon fiber, the carbon component being produced by carbonizing a thermosetting resin, the composite having a density within a range between 0.70 and 0.85 g/cm$^3$, both inclusive, and a thickness within another range between 0.7 and 3.0 cm, both inclusive, the method comprising the steps of (a) mixing the activated carbon fiber and the thermosetting resin to produce a mixture, (b) molding the mixture into a molded product having a predetermined shape, and (c) subjecting the molded product to heat treatment in a nonoxidizing atmosphere to carbonize the thermosetting resin so that an activated carbon/carbon composite electrode is obtained as the polarizable electrode, wherein:

the molding step is carried out by press-forming under a pressure between 0.1 and 8.0 tonf/cm$^2$, both inclusive.

According to a tenth aspect of this invention, there is provided a method for producing a polarizable electrode comprising an activated carbon/carbon composite consisting essentially of an activated carbon component and a carbon component, the activated carbon component comprising activated carbon fiber, the carbon component being produced by carbonizing a thermosetting resin, the composite having a density within a range between 0.70 and 0.85 g/cm$^3$, both inclusive, and a thickness within another range between 0.7 and 3.0 cm, both inclusive, the method comprising the steps of (a) mixing the activated carbon fiber and the thermosetting resin to produce a mixture, (b) molding the mixture into a molded product having a predetermined shape, and (c) subjecting the molded product to heat treatment in a nonoxidizing atmosphere to carbonize the thermosetting resin so that an activated carbon/carbon composite electrode is obtained as the polarizable electrode, wherein:

the mixing step is for mixing the activated carbon fiber, the thermosetting resin, and a thermoplastic resin binder in a ratio between 30 and 60 wt %, both inclusive, with respect to the total weight of the activated carbon fiber and the thermosetting resin to obtain the mixture; the molding step being carried out by extrusion-molding.

DESCRIPTION OF THE PREFERRED EMBODIMENTS

Figure 1:
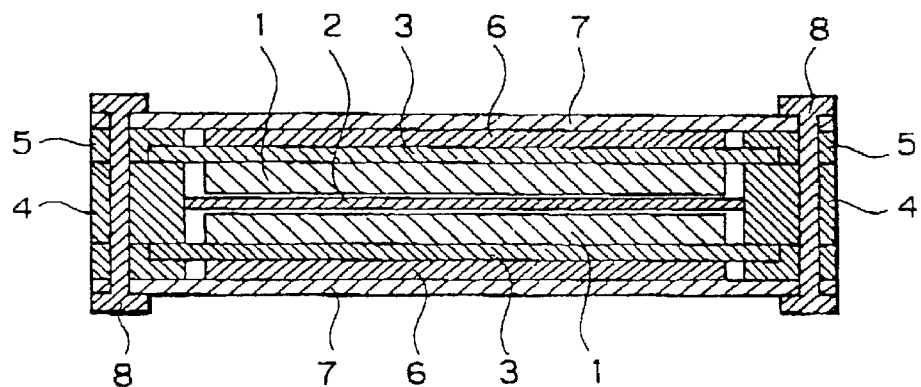
FIG. 1 is a sectional view of an electric double-layer capacitor including as a polarizable electrode an activated carbon/carbon composite electrode according to this invention.

Now, this invention will be described in detail with reference to the drawing.

At first, the principle of this invention will be described.

An activated carbon/carbon composite is formed by preparing a mixture of activated carbon powder or fiber and a thermosetting resin, molding the mixture into a molded product, and subjecting the molded product to heat treatment to carbonize the thermosetting resin. The activated carbon/carbon composite is used as a polarizable electrode for an electric double-layer capacitor. One of approaches to maximize an energy density of the electric double-layer capacitor is to increase a packing amount or density of the activated carbon powder or fiber. For this purpose, it is proposed to increase a mixing ratio of the activated carbon powder or fiber contained in the mixture or to increase a density of the electrode. However, if the mixing ratio of the activated carbon powder or fiber is increased, a molding density tends to reduce. Thus, a capacitance of the electric double-layer capacitor does not linearly increase following the increase in mixing ratio of the activated carbon powder or fiber.

The capacitance has a peak with respect to the mixing ratio of the activated carbon powder or fiber. On the other hand, if the density of the activated carbon/carbon composite electrode is increased while the mixing ratio of the activated carbon powder or fiber is kept unchanged, the capacitance at a room temperature linearly increases. However, when the density of the activated carbon/carbon composite electrode is increased, a gap within the activated carbon/carbon composite electrode is narrowed so that the capacitance at a low temperature is reduced under the influence of a resistance of an electrolytic solution. Thus, a low-temperature characteristic is deteriorated. In addition, the low-temperature characteristic is also influenced by a thickness of the activated carbon/carbon composite electrode. Furthermore, the density of the activated carbon/carbon composite electrode greatly depends upon a packing density of the activated carbon powder.

As a result of experimental studies, it is found out that, when the activated carbon/carbon composite electrode has a density within a range: between 0.70 and 0.85 g/cm$^3$ and a thickness not greater than 3 cm, the energy density has a highest level at each of the room temperature and the low temperature. While the above-mentioned range of the density is met, the relationship between the packing density (D) and the mixing ratio (R) of the activated carbon powder or fiber is represented by:

$$R = aD + b$$

$$(0.80 \leq a \leq 1.00, \ 0.24 \leq b \leq 0.39)$$

In order to obtain the activated carbon/carbon composite having a density within the above-mentioned range, press-forming is carried out under a pressure between 0.7 and 8.0 tonf/cm$^2$. In case of extrusion-forming, an extrusion binder is added in an amount of 30 to 60 wt %.

Next, a first specific example of this invention will be described.

Activated carbon powder is prepared in different packing densities of 0.32 g/cm$^3$, 0.45 g/cm$^3$, and 0.57 g/cm$^3$. As phenolic resin powder, phenol-formaldehyde resin powder is used. The activated carbon powder is mixed with the phenolic resin powder to produce powdery mixtures in various mixing ratios. Specifically, the activated carbon powder is contained in different weight ratios of 0.4, 0.5, 0.6, 0.7, 0.8, and 0.9 with respect to the total weight of the powdery mixture as a unity. Each powdery mixture is further mixed with a solvent of aceton in a weight ratio of 1.5 and kneaded to form a paste. The paste is dried by a vacuum drier in a vacuum at 50° C. for about three hours to remove the solvent, and is pulverized by an attritor. Resultant pulverized powder is subjected to cold press-forming at a pressure of 2.0 tonf/cm$^2$ to produce molded products having a same square size of 10 cm×10 cm and different thicknesses of 0.6, 0.7, 0.8, 1.0, 3.0, and 4.0 cm. In an electric furnace, the molded products are subjected to heat treatment in a nitrogen gas atmosphere at 900° C. for two hours. As a result, the phenolic resin is carbonized to produce an activated carbon/carbon composite.

Referring to FIG. 1, description will be lade about an electric double-layer capacitor prepared by the use of the activated carbon/carbon composite obtained in the above-mentioned manner. The electric double-layer capacitor comprises a pair of polarizable electrodes 1 each of which is similarly formed by the activated carbon/carbon composite described above. The polarizable electrodes 1 are immersed in a 30 wt % sulfuric acid aqueous solution as an electrolytic solution and impregnated with the electrolytic solution for two hours in a vacuum. Thereafter, the polarizable electrodes 1 are taken out from the aqueous solution and faced to each other with a polypropylene separator 2 interposed between the polarizable electrodes 1. Then, a pair of collectors 3 comprising conductive sheets of butyl rubber are crimped on opposite sides of the polarizable electrodes 1. In order to avoid the contact between the collectors 3 on the opposite sides, a polycarbonate gasket 4 is arranged around the polarizable electrodes 1. Then, a pair of polycarbonate supports 5 are disposed on both sides of the collectors 3. Thus, the collectors 3 are clamped by the supports 5 and the gasket 4. Furthermore, epoxy resin is applied around the gasket 4 and the supports 5 to seal the electrolytic solution. Then, a pair of terminal plates 6 of stainless steel are crimped on both sides of the collectors 3 for connection of lead wires. Finally, a pair of polycarbonate clamping plates 7 with holes formed at four corners thereof are attached on both sides of the terminal plates 6 and fastened by bolt/nut pairs 8 at the four corners. In this manner, the electric double-layer capacitor using the polarizable electrodes of this invention is obtained. The electric double-layer capacitor is charged by applying a constant voltage of 0.9 v for four hours at −20° C. and at 25° C., respectively. Thereafter, discharging at a constant current of 0.1 A is performed until a voltage level falls down to 0.45V. A required discharging time is monitored and used to calculate a capacitance of the electric double-layer capacitor.

Referring to FIGS. 2 through 6, description will be made about characteristics of the activated carbon/carbon composite electrode and the electric double-layer capacitor in this example.

Figure 2:
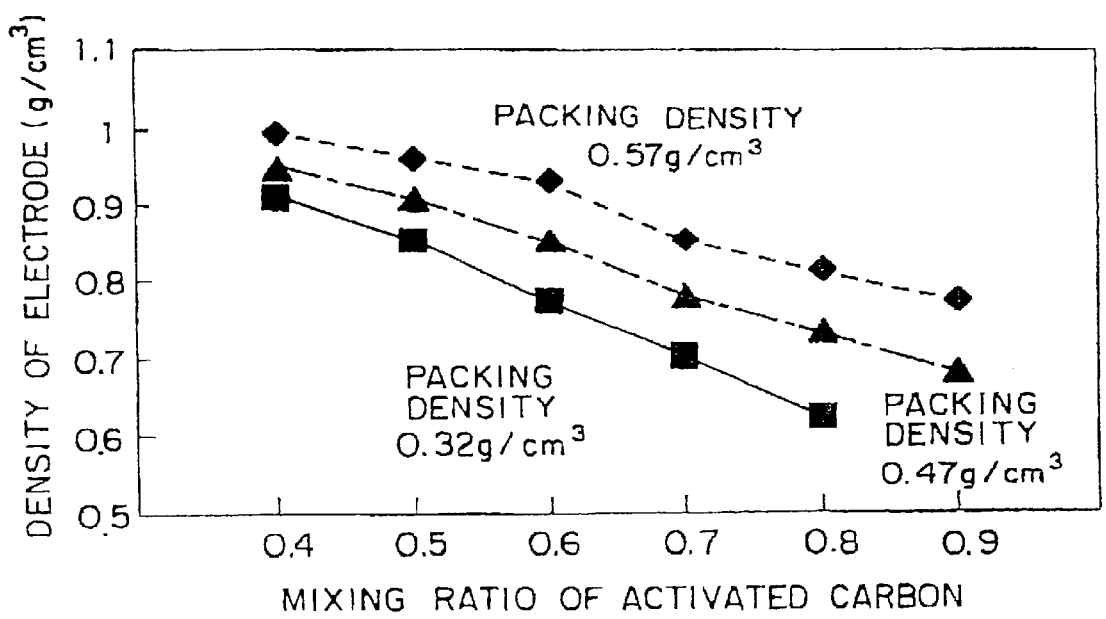
FIG. 2 is a graph showing the relationship between a density of the activated carbon/carbon composite electrode and a mixing ratio of activated carbon.

At first referring to FIG. 2, three samples of the activated carbon powder have different packing densities of 0.32 g/cm$^3$, 0.47 g/cm$^3$, and 0.57 g/cm$^3$, respectively. For each of these samples, a density of the activated carbon/carbon composite electrode at the press-forming pressure of 2 tonf/cm$^2$ is plotted with respect to the mixing ratio of the activated carbon powder. As seen from FIG. 2, the density of the activated carbon/carbon composite electrode becomes higher as the packing density of the activated carbon powder is greater even when the mixing ratio of the activated carbon powder is unchanged. With an increase in mixing ratio of the activated carbon powder, the density of the activated carbon/carbon composite electrode is decreased.

Figure 3:
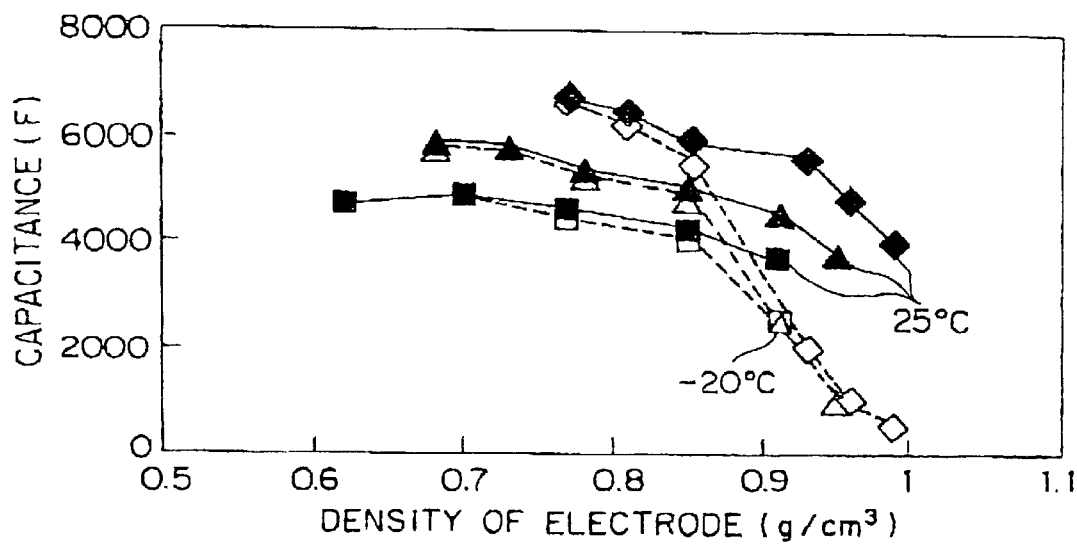
FIG. 3 is a graph showing the relationship between a capacitance of the electric double-layer capacitor and the density of the activated carbon/carbon composite electrode.

Referring to FIG. 3, the capacitance of the electric double-layer capacitor using the activated carbon/carbon composite electrode in this example is plotted with respect to the density of the activated carbon/carbon composite electrode. As seen from FIG. 3, the capacitance at 25° C. has a peak with respect to the density of the activated carbon/carbon composite electrode. The capacitance per unit volume is approximately equal to 50 F/cm$^3$. At −20° C., a similar tendency is observed but the capacitance drastically reduces at the density of 0.85 g/cm$^3$ or more. On the other hand, at the density of 0.70 g/cm$^3$ or less, the capacitance is reduced and a mechanical strength of the electrode is noticeably reduced. From the above-mentioned results, it is understood that the activated carbon/carbon composite electrode adapted for the intended use has the density within a range between 0.70 and 0.85 g/cm$^3$.

Figure 4:
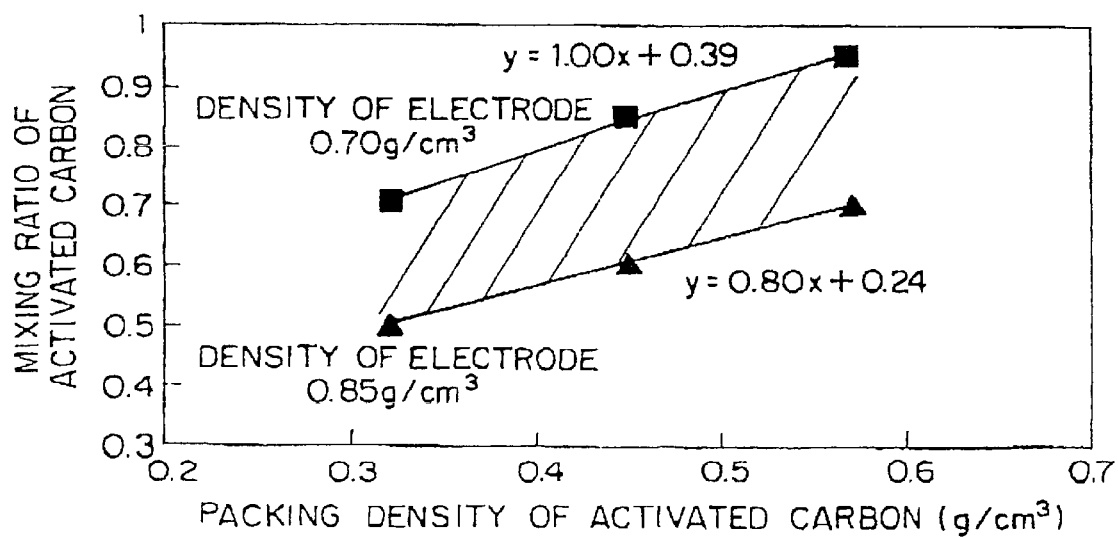
FIG. 4 is a graph showing the relationship between the mixing ratio of activated carbon and the packing density of activated carbon as a powdery material.

Referring to FIG. 4, the mixing ratio of the activated carbon powder is plotted with respect to the packing density of the activated carbon powder for each of the densities of 0.70 g/cm$^3$ and 0.85 g/cm$^3$ of the activated carbon/carbon composite electrode. Thus, the hatched region in FIG. 4 shows such a range that the density of the activated carbon/carbon composite electrode falls between 0.70 and 0.85 g/cm$^3$. In order to satisfy the above-mentioned range, the mixing ratio (PR) and the packing density (D) of the activated carbon powder have the relationship given by:

$$R=aD+b$$

$$(0.80 \leq a \leq 1.00, 0.24 \leq b \leq 0.39)$$

Figure 5:
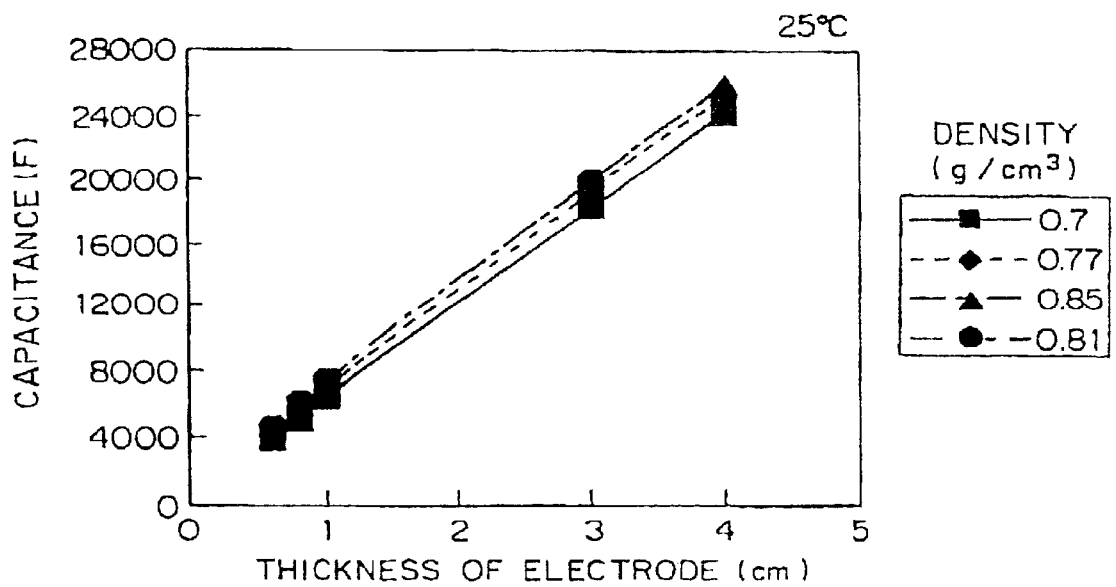
FIG. 5 is a graph showing the relationship between the capacitance of the electric double-layer capacitor at 25° C. and a thickness of the activated carbon/carbon composite electrode.
Figure 6:
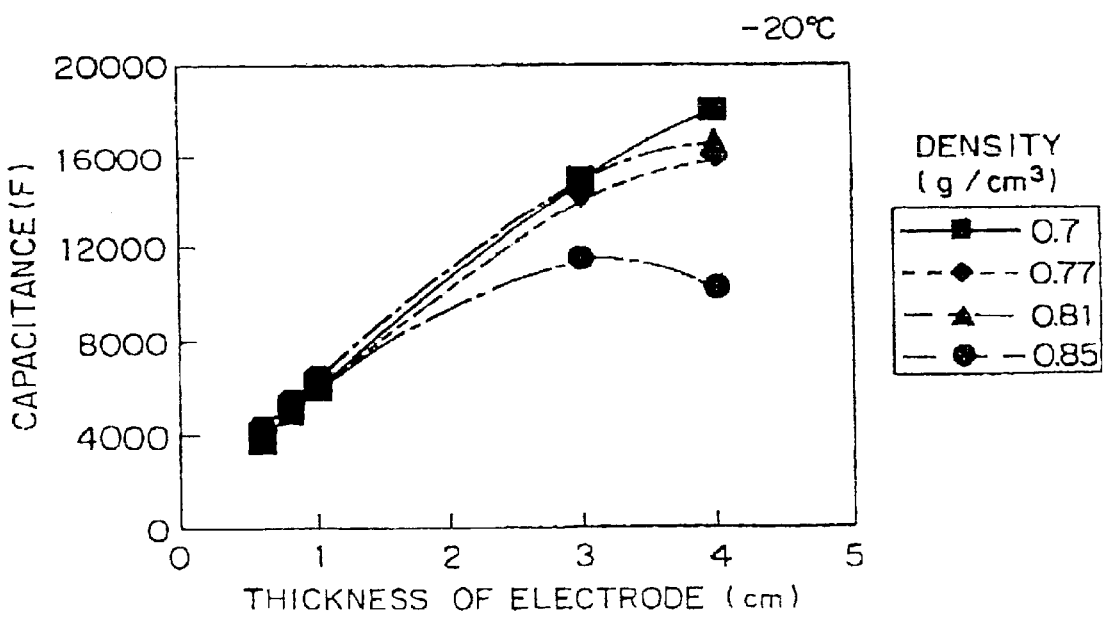
FIG. 6 is a graph showing the relationship between the capacitance of the electric double-layer capacitor at -20° C. and the thickness of the activated carbon/carbon composite electrode.

Next referring to FIGS. 5 and 6, the capacitance of the electric double-layer capacitor at 25° C. and −20° C. is plotted with respect to a thickness of the activated carbon/carbon composite electrode, respectively. As seen from FIG. 5, the capacitance at 25° C. substantially linearly increases following an increase in thickness of the activated carbon/carbon composite electrode. On the other hand, as seen from FIG. 6, the capacitance at −20° C. does not linearly increase following the increase in thickness of the activated carbon/carbon electrode under the influence of the resistance of the electrolytic solution. At a low density, the influence of the thickness is small. On the other hand, at a higher density, the capacitance at −20° C. drastically decreases when the thickness is greater than 3.0 cm. The activated carbon/carbon composite electrode having a thickness of 0.6 cm or more is very weak in mechanical strength and can not be assembled into the electric double-layer capacitor.

From the above-mentioned results, it is understood that the activated carbon/carbon composite electrode preferably has a density within a range between 0.70 and 0.85 g/cm$^3$ and a thickness within a range between 0.7 and 3.0 cm in order to assure a large capacitance and an excellent low-temperature characteristic as required in an outdoor solar generator system. The mixing ratio (R) and the packing density (D) of the activated carbon powder is desired to have a relationship given by:

$$R=aD+b$$

$$(0.80 \leq a \leq 1.00, 0.24 \leq b \leq 0.39)$$

Description will be made about a second specific example of this invention.

Activated carbon powder is prepared in different packing densities of 0.32 g/cm$^3$ and 0.57 g/cm$^3$. As phenolic resin powder, phenol-formaldehyde resin powder is used. The activated carbon powder is mixed with the phenolic resin powder to produce powdery mixtures each of which contains the activated carbon powder in a weight ratio of 0.7 with respect to the total weight of the powdery mixture as a unity. Each powdery mixture is further mixed with a solvent of aceton in a weight ratio of 1.5 and kneaded to form a paste. The paste is dried by a vacuum drier in a vacuum at 50° C. for about three hours to remove the solvent, and is pulverized by an attritor. Resultant pulverized powder is subjected to cold press forming at different press-forming pressures of 0.05, 0.1, 1.0, 2.0, 6.0, and 10.0 tonf/cm$^2$ to produce molded products having a square size of 10 cm×10 cm and a thickness of 0.8 cm. In an electric furnace, the molded products are subjected to heat treatment in a nitrogen gas atmosphere at 900° C. for two hours. As a result, the phenolic resin is carbonized to produce an activated carbon/ carbon composite. The activated carbon/carbon composite is used as a polarizable electrode of an electric double-layer capacitor, as described in conjunction with the first example.

Figure 7:
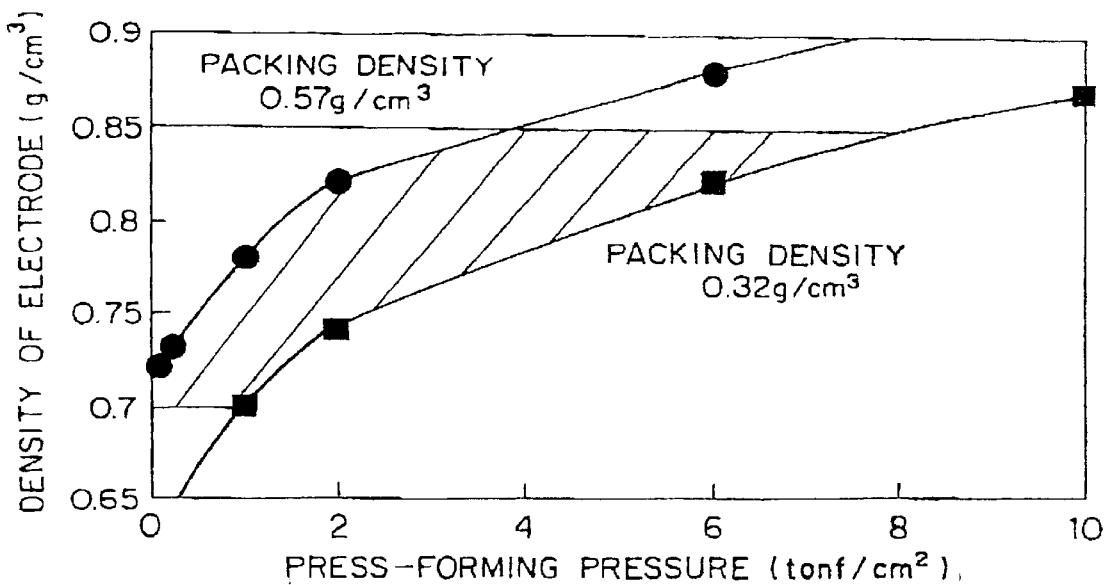
FIG. 7 is a graph showing the relationship between the density of the activated carbon/carbon composite electrode and a press-forming pressure.

Referring to FIG. 7, the density of the activated carbon/carbon composite electrode obtained in this example is plotted with respect to the press-forming pressure for each of the packing densities of 0.32 g/cm$^3$ and 0.57 g/cm$^3$. As seen from FIG. 7, the density of the activated carbon/carbon composite electrode can be controlled by the press-forming pressure, As mentioned in conjunction with the first example, the activated carbon/carbon composite electrode adapted for the intended use has the density within a range between 0.70 and 0.85 g/cm$^3$. The hatched portion in FIG. 7 shows the above-mentioned range which corresponds to the press-forming pressure not higher than 8.0 tonf/cm$^2$. It is noted here that, when the press-forming pressure is lowered down to 0.05 tonf/cm$^2$, the activated carbon/carbon composite electrode is too brittle to maintain its shape. Therefore, the press-forming pressure must be selected between 0.1 and 8.0 tonf/cm$^2$ so as to meet the above-mentioned range and to enable molding. Next, description will be made about a third specific example of this invention.

Activated carbon powder is prepared in different packing densities of 0.32 g/cm$^3$ and 0.57 g/cm$^3$ As phenolic resin powder, phenol-formaldehyde resin powder is used. The activated carbon powder is mixed with the phenolic resin powder to produce powdery mixtures each of which contains the activated carbon powder in a weight ratio of 0.7 with respect to the total weight of the powdery mixture as a unity. Each powdery mixture is further mixed with a solvent of aceton in a weight ratio of 0.3 and kneaded to form a paste. The paste is dried by a vacuum drier in a vacuum at 50° C. for about three hours to remove the solvent, and is pulverized by an attritor. To resultant pulverized powder of 100 wt %, an extrusion binder of methylcellulose is mixed in different ratios of 20, 30, 40, 50, 60, and 70 wt %. Each resultant mixture of 100 wt % is mixed with water of 40 wt % and kneaded by a kneader until a viscous paste is obtained.

The paste is subjected to continuous extrusionforming by an extruder to form a molded sheet having a width of 10 cm and a thickness of 0.8 cm. The molded sheet is dried at 105° C. for two hours and cut into pieces as molded products having a length of 10 cm. In an electric furnace, the molded products are subjected to heat treatment in a nitrogen gas atmosphere at 900° C. for two hours. As a result, the phenolic resin is carbonized to obtain an activated carbon/carbon composite.

Figure 8:
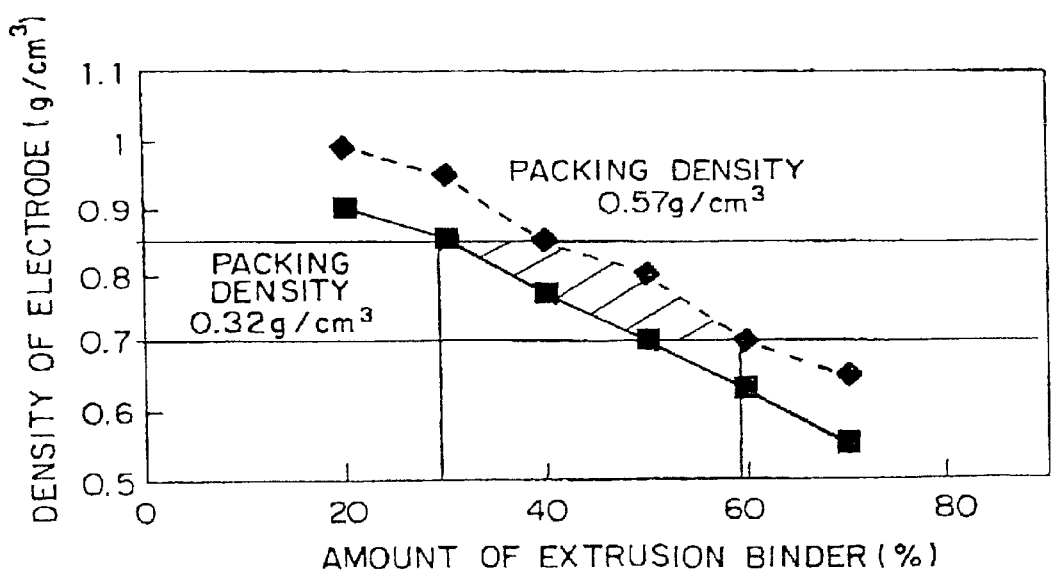
FIG. 8 is a graph showing the relationship between the density of the activated carbon/carbon composite electrode and the amount of an extrusion binder.

Referring to FIG. 8, the density of the activated carbon/carbon composite electrode obtained in this example is plotted with respect to the amount of the extrusion binder for each of the packing densities of 0.32 g/cm$^3$ and 0.57 g/cm$^3$. As seen from FIG. 8, the density of the activated carbon/carbon composite electrode can be controlled by the amount of the extrusion binder. As mentioned in conjunction with the first example, the activated carbon/carbon composite electrode adapted for the intended use has the density within a range between 0.70 and 0.85 g/cm$^3$. The hatched-portion in FIG. 8 shows the above-mentioned range. Therefore, the amount of the extrusion binder must be selected between 30 and 60 wt % so as to meet the above-mentioned range.

As described above, the electric double-layer capacitor having a large capacitance and an excellent low-temperature characteristic is obtained by selecting the relationship between the density and the thickness of the activated carbon/carbon composite electrode as well as the relationship between the mixing ratio and the packing density of the activated carbon powder. Furthermore, by controlling the press-forming pressure or the amount of the extrusion binder in extrusion-forming, it is possible to obtain the activated carbon/carbon composite electrode adapted for use in the above-mentioned electric double-layer condenser.

Although the phenolic resin is used as the thermosetting resin in each of the foregoing examples, the similar result is obtained by the use of at least one selected from a group including a furan resin, a urea resin, a melamine resin, a guanamine resin, an unsaturated polyester resin, a diallyl phthalate resin, an allyl diglycol carbonate resin, an epoxy resin, a vinyl ester resin, a phenoxy resin, and a polyurethane resin. Although the activated carbon powder is used in each of the foregoing examples, a similar result is obtained by the use of activated carbon fiber.

What is claimed is:

1. A method of producing a polarizable electrode comprising an activated carbon/carbon composite consisting essentially of an activated carbon component and a carbon component, said activated carbon component comprising activated carbon powder, said carbon component being produced by carbonizing a thermosetting resin, said composite having a density within a range between 0.70 and 0.85 g/cm$^3$, both inclusive, and a thickness within another range between 0.7 and 3.0 cm, both inclusive, said method comprising the steps of (a) mixing said activated carbon powder and said thermosetting resin to produce a powdery mixture, (b) molding said powdery mixture into a molded product having a predetermined shape, and (c) subjecting said molded product to heat treatment in a nonoxidizing atmosphere to carbonize said thermosetting resin so that an activated carbon/carbon composite electrode is obtained as said polarizable electrode, wherein:

said molding step is carried out by press-forming under a pressure between 0.1 and 8.0 tonf/cm$^2$, both inclusive.

2. A method of producing a polarizable electrode comprising an activated carbon/carbon composite consisting essentially of an activated carbon component and a carbon component, said activated carbon component comprising activated carbon powder, said carbon component being produced by carbonizing a thermosetting resin, said composite having a density within a range between 0.70 and 0.85 g/cm$^3$, both inclusive, and a thickness within another range between 0.7 and 3.0 cm, both inclusive, said method comprising the steps of (a) mixing said activated carbon powder and said thermosetting resin to produce a powdery mixture, (b) molding said powdery mixture into a molded product hating a predetermined shape, and (c) subjecting said molded product to heat treatment in a nonoxidizing atmosphere to carbonize said thermosetting resin so that an activated carbon/carbon composite electrode is obtained as said polarizable electrode, wherein:

said mixing step is for mixing said activated carbon powder, said thermosetting resin, and a thermoplastic resin binder in a ratio between 30 and 60 wt %, both inclusive, with respect to the total weight of said activated carbon powder and said thermosetting resin to obtain said powdery mixture;

said molding step being carried out by extrusion-molding.

3. A method of producing a polarizable electrode comprising an activated carbon/carbon composite consisting essentially of an activated carbon component and a carbon component, said activated carbon component comprising activated carbon fiber, said carbon component being produced by carbonizing a thermosetting resin, said composite having a density within a range between 0.70 and 0.85 g/cm$^3$, both inclusive, and a thickness within another range between 0.7 and 3.0 cm, both inclusive, said method comprising the steps of (a) mixing said activated carbon fiber and said thermosetting resin to produce a mixture, (b) molding said mixture into a molded product having a predetermined shape, and (c) subjecting said molded product to heat treatment in a nonoxidizing atmosphere to carbonize said thermosetting resin so that an activated carbon/carbon composite electrode is obtained as said polarizable electrode, wherein:

said molding step is carried out by press-forming under a pressure between 0.1 and 8.0 tonf/cm$^2$, both inclusive.

4. A method of producing a polarizable electrode comprising an activated carbon/carbon composite consisting essentially of an activated carbon component and a carbon component, said activated carbon component comprising activated carbon fiber, said carbon component being produced by carbonizing a thermosetting resin, said composite having a density within a range between 0.70 and 0.85 g/cm$^3$, both inclusive, and a thickness within another range between 0.7 and 3.0 cm, both inclusive, said method comprising the steps of (a) mixing said activated carbon fiber and said thermosetting resin to produce a mixture, (b) molding said mixture into a molded product having a predetermined shape, and (c) subjecting said molded product to heat treatment in a nonoxidizing atmosphere to carbonize said thermosetting resin so that an activated carbon/carbon composite electrode is obtained as said polarizable electrode, wherein:

said mixing step is for mixing said activated carbon fiber, said thermosetting resin, and a thermoplastic resin binder in a ratio between 30 and 60 wt %, both inclusive, with respect to the total weight of said activated carbon fiber and said thermosetting resin to obtain said mixture; said molding-step being carried out by extrusion-molding.

* * * * *